United States Patent
Soryal (10) Patent No.: US 11,316,884 B2
(45) Date of Patent: Apr. 26, 2022

(54) SOFTWARE DEFINED NETWORK WHITE BOX INFECTION DETECTION AND ISOLATION

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 209 days.

(21) Appl. No.: 16/558,592

(22) Filed: Sep. 3, 2019

(65) Prior Publication Data
US 2021/0067539 A1  Mar. 4, 2021

(51) Int. Cl.
*H04L 29/06* (2006.01)
*H04L 43/10* (2022.01)

(52) U.S. Cl.
CPC .......... *H04L 63/1433* (2013.01); *H04L 43/10* (2013.01); *H04L 63/1416* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,528,061 B1 * | 9/2013 | Davis | H04L 67/02 726/6 |
| 2016/0226913 A1 * | 8/2016 | Sood | G06F 21/577 |
| 2018/0034922 A1 * | 2/2018 | Gopalan | G06N 20/00 |

* cited by examiner

*Primary Examiner* — Cai Y Chen
(74) *Attorney, Agent, or Firm* — Guntin & Gust, PLC; Ralph Trementozzi (57) ABSTRACT

A method and system for white box infection detection and isolation. The methods and systems can monitor a plurality of white boxes deployed within a communications network; send a challenge to a first white box of the plurality of white boxes; determine a processing time to answer the challenge by the first white box; in response to receiving the answer to the challenge, determine whether the processing time exceeds an average processing time for the challenge by a predetermined percentage; and in response to the processing time exceeding the average processing time by the predetermined percentage, isolate the first white box from the communications network.

20 Claims, 7 Drawing Sheets

SOFTWARE DEFINED NETWORK WHITE BOX INFECTION DETECTION AND ISOLATION

TECHNICAL FIELD

The technical field generally relates to software defined networks (SDNs) and, more specifically, to systems and methods for white box infection detection and isolation within an SDN.

BACKGROUND

Communication networks have migrated from using specialized networking equipment executing on dedicated hardware, like routers, firewalls, and gateways, to SDNs executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and virtual network interfaces or virtual network interface cards (vNICs). Cloud systems are complex multi-layer hardware and software systems that consist of multiple services and components, interacting with each other through complicated mechanisms.

To reduce costs and provide flexibility in communication network design, SDNs can utilize commodity equipment, e.g., white box hardware. However, using commodity equipment throughout a communications network can be exploited by hackers that are able to use similar techniques on each piece of commodity equipment due to each piece of commodity equipment being identical or very similar in design and operation with one another. Infiltrating multiple pieces of commodity equipment in the communications network can lead to widespread network outages, as well as data theft and further illicit activity. This disclosure is directed to addressing issues in the existing technology.

SUMMARY

Determining that a hacker has compromised a white box used within a communications network is crucial in order to prevent a wide-scale interruption or data theft. Disclosed herein is a framework for white box infection detection and isolation that efficiently mitigates damage to a communications using identical or similar equipment (white boxes) by challenging each white box to determine if the white box has been compromised and isolating the white box from the communications network if the white box is determined to be compromised.

In an example, there may be a computer-implemented method for white box infection detection and isolation. The computer-implemented method includes monitoring a plurality of white boxes deployed within a communications network; sending a challenge to a first white box of the plurality of white boxes; determining a processing time to answer the challenge by the first white box; in response to receiving the answer to the challenge, determining whether the processing time exceeds an average processing time for the challenge by a predetermined percentage; and in response to the processing time exceeding the average processing time by the predetermined percentage, isolating the first white box from the communications network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally commodity white box hardware (also referred to herein as a white box) are generic servers having standardized commodity parts that can have virtual machines (VMs) installed on them or generic networking elements (e.g. router) that can be configured by software (e.g., SDN elements). While white boxes tend not include as many features as proprietary hardware, white boxes tend to be less expensive and operate at speeds sufficiently close to that of proprietary hardware. Accordingly, white boxes are increasingly being introduced into communication networks.

A white box may come pre-loaded with minimal software, or it may be sold as a bare metal device. An SDN environment may employ many white boxes (e.g., tens, hundreds, or thousands). When utilized in an SDN environment, white boxes can be programmed to use, for example, an OpenFlow protocol or another southbound application program interface (API) to create routing tables and route connections.

In addition, because white boxes are essentially identical (e.g., same or similar hardware and software (e.g., firmware, operating system and applications)), when purchased from the same or other vendors, if one white box in the SDN environment is compromised via an attack (e.g., the white box is hacked or otherwise accessed in an unauthorized manner), then all white boxes in the SDN environment are similarly compromised.

These attacks can severely impact a communications network or entities using the communications network. For example, attacks could modify core settings or configurations of the communications network thereby causing non-intended operational aspects such as: 1) copying of traffic on the communications network and forward the copied traffic to a designated internet protocol (IP) address, 2) allowing a remote attacker to alter a traffic route of network data or alter the network data itself, or 3) crash the communications network entirely or apportion thereof, etc.

Accordingly, disclosed herein are techniques that utilize one or more white box integrity management systems (WIMS) to detect an infection (e.g., a successful attack on one or more white boxes) of one or more white boxes in a communications network. The techniques disclosed herein can additionally isolate the infected white boxes, notify technical support or network engineers of an attack, or identify white boxes that have been compromised.

Figure 1:
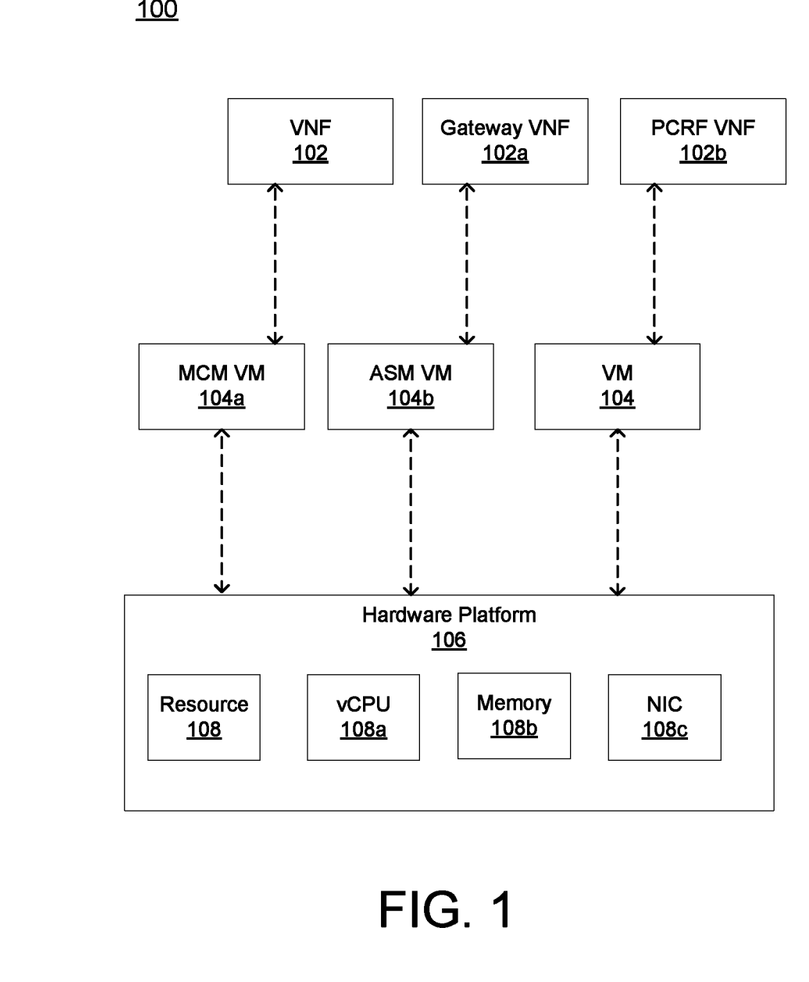
FIG. 1 is a representation of an exemplary network.

FIG. 1 is a representation of an exemplary network 100. Network 100 (may comprise an SDN, for example, network 100 may include one or more virtualized functions implemented on a plurality of white boxes, such as in lieu of having dedicated hardware for every network function. Each white box or a portion of the plurality of white boxes of network 100 may be configured to run virtual network elements to support communication services, such as mobility services, including consumer services and enterprise services. These services may be provided or measured in sessions.

Virtual network functions (VNFs) 102 may be able to support a limited number of sessions. Each VNF 102 may have a VNF type that indicates its functionality or role. For example, FIG. 1 illustrates a gateway VNF 102a and a policy and charging rules function (PCRF) VNF 102b. Additionally or alternatively, VNFs 102 may include other types of VNFs. Each VNF 102 may use one or more virtual machines (VMs) 104 to operate. Each VM 104 may have a VM type that indicates its functionality or role. For example, FIG. 1 illustrates a management control module (MCM) VM 104a, an advanced services module (ASM) VM 104b, and a DEP VM 104c. Additionally or alternatively, VMs 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 2:
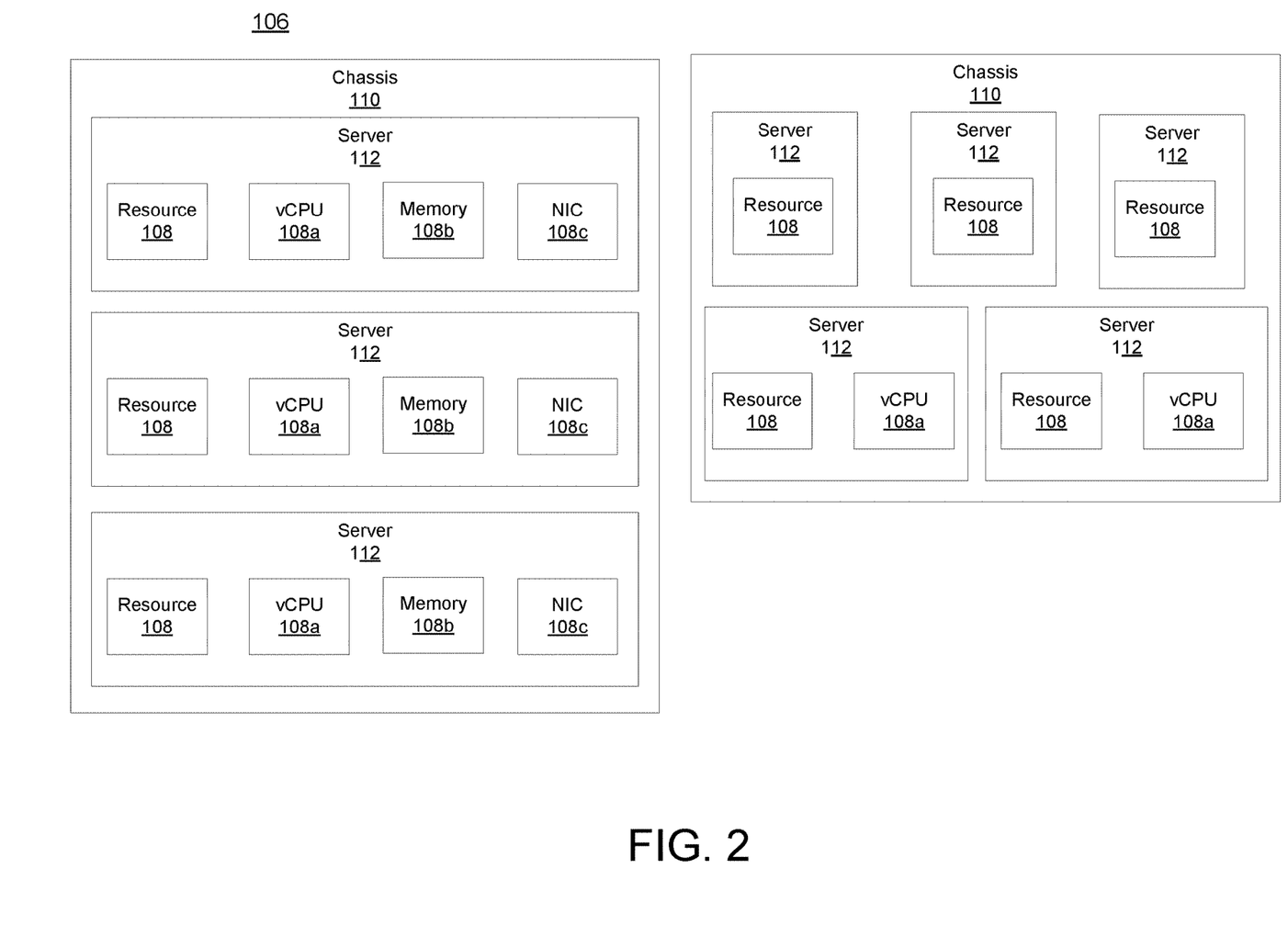
FIG. 2 is a representation of an exemplary hardware platform for a network.

While FIG. 1 illustrates resources 108 as collectively contained in hardware platform 106, the configuration of hardware platform 106 may isolate, for example, certain memory 108b from other memory 108b. FIG. 2 provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may be a white box. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally, or alternatively, chasses 110 may be communicatively coupled together (not shown) in any combination or arrangement.

At least one server of servers 112 may comprise an SDN controller that is responsible for instantiating, configuring, managing, and releasing VNFs. For example, the SDN controller may instantiate VNFs on shared hardware, e.g., network function virtualization infrastructure (NFVI) or host devices or SDN nodes, which may be physically located in various places within the network 100. For example, SDN nodes (e.g., white box, a VM, a VM over a white box, servers, clients, peers, etc.) may reside in various data centers distributed in various locations. For example, a router may be instantiated on an SDN node, and released when the router is no longer needed.

Similarly, a media server may be instantiated on an SDN node, and released when no longer needed. In one example, the configuring, releasing, and reconfiguring of SDN nodes is controlled by the SDN controller, which may store configuration codes, e.g., computer or processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Servers 112 may be from the same manufacturer or may be based on identical or very similar operational specifications (e.g., hardware, firmware, operating system, applications, etc.). In addition, a portion of servers 112 may be from one manufacturer, while another portion of servers 112 may be from another manufacturer.

The characteristics of each chassis 110 and each server 112 may differ. For example, FIG. 2 illustrates that the number of servers 112 within two chasses 110 may vary. Additionally, or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same server 112 or set of servers 112. For example, if VM 104 uses eight vCPUs 108a, 1 GB of memory 108b, and two NICs 108c, the rules may require that all of these resources 108 be sourced from the same server 112. Additionally, or alternatively, VM 104 may require splitting resources 108 among multiple servers 112, but such splitting may need to conform with certain restrictions. For example, resources 108 for VM 104 may be able to be split between two servers 112. Default rules may apply. For example, a default rule may require that all resources 108 for a given VM 104 must come from the same server 112.

An affinity rule may restrict assignment of resources 108 for a particular VM 104 (or a particular type of VM 104). For example, an affinity rule may require that certain VMs 104 be instantiated on (e.g., consume resources from) the same server 612 or chassis 110. For example, if VNF 102 uses six MCM VMs 104a, an affinity rule may dictate that those six MCM VMs 104a be instantiated on the same server 112 (or chassis 110). As another example, if VNF 102 uses MCM VMs 104a, ASM VMs 104b, and a third type of VMs 104, an affinity rule may dictate that at least the MCM VMs 604a and the ASM VMs 104b be instantiated on the same server 112 (or chassis 110). Affinity rules may restrict assignment of resources 108 based on the identity or type of resource 108, VNF 102, VM 104, chassis 110, server 112, or any combination thereof.

An anti-affinity rule may restrict assignment of resources 108 for a particular VM 104 (or a particular type of VM 104). In contrast to an affinity rule, which may require that certain VMs 104 be instantiated on the same server 112 or chassis 110, an anti-affinity rule requires that certain VMs 104 be instantiated on different servers 112 (or different chasses 110). For example, an anti-affinity rule may require that MCM VM 104a be instantiated on a particular server 112 that does not contain any ASM VMs 104b. As another example, an anti-affinity rule may require that MCM VMs 104a for a first VNF 102 be instantiated on a different server 112 (or chassis 110) than MCM VMs 104a for a second VNF 102. Anti-affinity rules may restrict assignment of resources 108 based on the identity or type of resource 108, VNF 102, VM 104, chassis 110, server 112, or any combination thereof.

Figure 3:
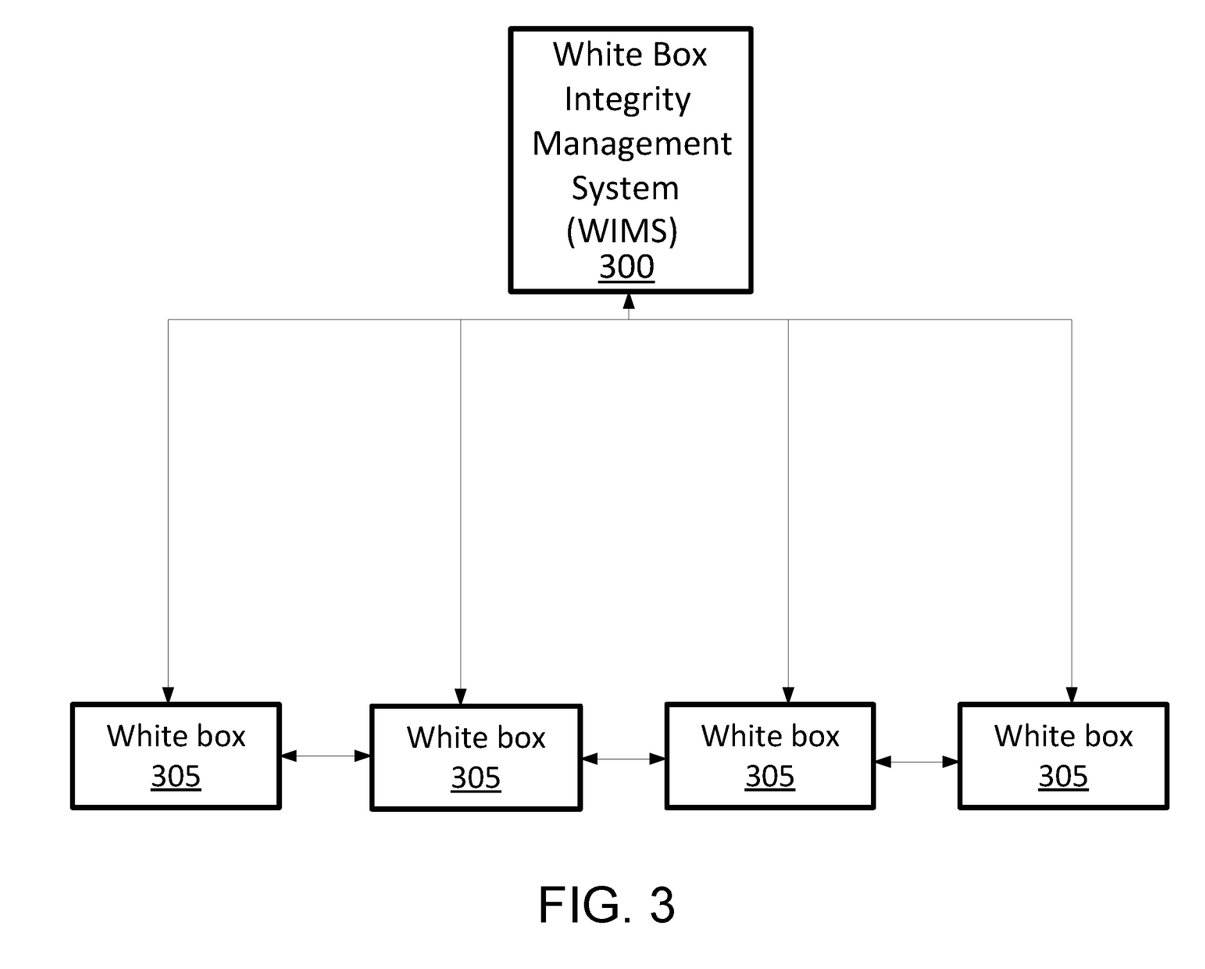
FIG. 3 illustrates an exemplary block diagram of a white box integrity management systems (WIMS) for a network according to one or more embodiments.

FIG. 3 illustrates an exemplary white box integrity management system (WIMS) 300 used to monitor white boxes 305 within network 100 according to one or more embodiments. The WIMS 300 can reside within network 100 and be communicatively coupled to one or more white boxes 305 within network 100, for example, servers 112.

The WIMS 300 can maintain a log of operational specifications for each white box 305. For example, the WIMS 300 can maintain a copy of the original core (e.g., firmware and Operating System) of each make and model of every white box 305 in the network 100. Also, the WIMS 300 may communicate with the manufacturer of each white box to obtain of the original core. The WIMS 300 can maintain a copy of code and configuration data for each VM 104 of each white box 305. For example, the WIMS 300 can obtain the code and configuration data from an administrator or VM creator deployed in the network 100. Accordingly, the WIMS 300 can use the obtained original core information to gain insight into a topology for the network 100.

Each white box 305 may be communicatively coupled to neighboring white boxes 305. For example, white box B may be communicatively coupled to white box A and white box C. Each white box 305 can maintain a copy of configuration data and operational specifications for an associated neighboring white box 305. Each white box can receive the configuration data and operational specifications for an associated neighboring white box 305 via WIMS 300.

In order to ensure communications with a specified white box 305, WIMS 300 may periodically transmit a keep alive message to the specified white box 305. Upon transmission of the keep alive message to the specified white box 305, the WIMS 300 can wait for a response to the keep alive message from the specified white box 305. The keep alive message may comprise information related to a CPU, memory, or bandwidth average usage for the specified white box 305.

An SDN node (e.g., specified white box 305) can monitor a round trip time for a request (e.g., a keep alive message sent to the specified white box 305), as well as when a response to the keep alive message is received by the WIMS 300 from the specified white box 305. The SDN node can store the response (e.g., CPU, memory, or bandwidth average usage data associated with the specified white box 305) in a distributed ledger (e.g., blockchain). Blockchains are generally digital data structures that facilitate recording digital information. A blockchain may serve as a public ledger for transactions. Using cryptography, blockchains allow participants to publish digital information in a secure and immutable way. The SDN node can additionally store information related to a querying SDN node (e.g., WIMS 300 or a white box 305), a queried SDN node (e.g., specified white box 305) and a time stamp for the keep alive message in the distributed ledger.

In addition to sending periodic keep alive messages to one or more white boxes 305, the WIMS 300 can also send a challenge to a specified white box 305. A response to the challenge by the specified white box 305 can be used by the WIMS to determine if the specified white box has been hacked or otherwise compromised. The challenge can be included in one or more of the keep alive messages periodically sent to the specified white box 305. Accordingly, the WIMS 300 can periodically introduce a challenge into one or more of the periodic keep alive messages sent to the specified white box 305.

The WIMS 300 can utilize a hash function to encrypt the challenge by including additional or random data (e.g., numbers, letters, codes, puzzles (e.g. solve $x^3+y^2+7$ when $x=2$ and $y=3$), etc., or a combination thereof depending on desired complexity) to the information related to a CPU, memory and bandwidth average usage for the specified white box 305. For example, periodically, WIMS 300 can send a challenge to white box A (e.g., within a keep alive message) using a random number. The challenge can be a hash of the CPU information, memory information, bandwidth average usage information and a random number. Another exemplary challenge can be a hash of a firmware code+an OS code+a random number+an OS time stamp indicating an initiation of the hashing operation+information for a VM (optional). Once white box A has completed the challenge, the white box A can return a response to the WIMS 300.

Keep alive messages sent by the WIMS 300, as well as responses received for the specified white box 305 can also be encrypted using a predetermined encryption scheme. In addition, a message length for keep alive messages including the challenge can be the same length as the keep alive message that does not include the challenge. Having keep alive messages of the same length may be beneficial because hackers that may have compromised the designated white box 305 would not know which keep alive messages include a challenge.

In response to a challenge being sent to the specified white box 305, the WIMS 300 can determine a time period the specified white box 305 takes to complete the challenge (e.g., challenge processing time) along with the associated response sent from the specified white box 305 to the WIMS 300 by subtracting a round-trip time for the keep-alive message. For example, the WIMS 300 can simulate challenges based on predetermined challenge criteria, such as numbers, letters, codes, or puzzles (e.g. solve $x^3+y^2+7$ when $x=2$ and $y=3$). The WIMS 300 can utilize the simulation results to determine an average or expected processing time for a given challenge criteria. Accordingly, the WIMS 300 can establish a normal processing time indicating how long a subject white box will take to solve a challenge.

The WIMS 300 can compare the received challenge processing time to challenge processing times of other white boxes 305 that have identical or very similar operational specifications (e.g., the normal challenge processing time, which can be determined through one or more simulations). The normal challenge processing time can vary based on the complexity of the challenge (e.g., numbers, letters, codes, puzzles or a combination thereof) sent by the WIMS 300. If the received challenge processing time for the specified white box 305 does not exceed the normal challenge processing time by a predetermined percentage, the WIMS 300 determines that the specified white box 305 is not infected and stores the processing information for the specified white box 305 for further analysis.

If the received challenge processing time for the specified white box 305 exceeds the normal challenge processing time by a predetermined percentage (e.g., +10%), the WIMS 300 can isolate the specified white box 305 from other components of the network. For example, the WIMS 300 can isolate the compromised white box 305 by sending commands to white boxes connected to the compromised white box 305 indicating that the white boxes should not accept or send traffic to the compromised white box 305. The WIMS 300 can additionally send updated networking rules or security policies to the white boxes connected to the compromised white box 305 thereby prohibiting the white boxes from sending or receiving data from the compromised white box 305, which could occur in a manner similar to backlisting certain IP addresses from communication. Accordingly, the WIMS 300 can limit the damage hackers can inflict on other white boxes 305 having identical or very similar operational specifications despite having compromised the specified white box 305.

The WIMS 300 can additionally take remedial measures to address the white box 305 that has been compromised. For example, the WIMS 300 can tear down an infected VM of the white box 305 that has been compromised and build a new one using a non-infected copy of the VM stored in a database stored in memory (e.g., memory 108b). In an instance in which a white box platform and firmware is infected, the WIMS 300 can remove the infected firmware and replace the infected firmware with non-infected copy of the firmware stored in a database stored in memory.

In other instances, the WIMS 300 can set off an alarm indicating that the specified white box 305 may be compromised. The alarm can be transmitted to technical support or network engineers having access to the specified white box 305. The technical support or network engineers can verify that the specified white box 305 has been compromised and take remedial measures.

The WIMS 300 can utilize machine learning to determine different processing times comparable to different levels of CPU, memory, or BW usages for the white boxes 305, as well as an associated complexity or length for the random data included in a challenge. Machine learning allows a trained model to learn from and make predictions on data. Machine learning operates by building a model from an example training set of input data in order to make predictions or decisions expressed as outputs. Machine learning can employ predictive analytics to discover expected or normal changes (e.g., log accumulation, etc.) to white boxes 305 as they age through learning from historical relationships and trends in the data.

The determination of different processing times could be determined using challenge processing times received after keep alive messages are sent to the white boxes or could be generated by simulation using a mathematical process to analyze copies of the original core (e.g., firmware and operating system) of each make and model white boxes 305 and copies of code and configuration data for each VM 104 to determine the normal challenge processing time. Accordingly, the WIMS 300 can adjust white box compromise determinations by factoring in expected or normal changes that occur to the white boxes 305, which can slow operations for a given white box 305.

In order to provide additional or alternative modes for limiting infiltration of white boxes 305 within the network 100, each white box 305 can maintain a copy of the original core (e.g., firmware and Operating System) of each make and model neighboring white boxes 305. In addition, each white box 305 can maintain a copy of code and configuration data for a VM 104 of neighboring white boxes 305. Likewise, each white box 305 can send keep alive messages to neighboring white boxes 305. The white box 305 can also send a challenge to a neighboring white box 305. A response to the challenge by the neighboring white box 305 can be used by the WIMS to determine if the neighboring white box has been hacked or otherwise compromised. The challenge can be included in one or more of the keep alive messages periodically sent to the neighboring white box 305. Accordingly, the white box 305 can periodically introduce a challenge into one or more of the periodic keep alive messages sent to the neighboring white box 305. The white box 305 can also utilize a hash function to encrypt the challenge sent to neighboring white boxes 305 by including additional or random data (e.g., numbers, letters, codes, puzzles (e.g. solve $x^3+y^2+7$ when $x=2$ and $y=3$), etc., or a combination thereof depending on desired complexity) to the information related to a CPU, memory and bandwidth average usage for an associated neighboring white box 305.

In response to a challenge being sent to a neighboring white box 305, the white box 305 can receive a time period the neighboring white box 305 takes to complete the challenge (e.g., challenge processing time). The white box 305 can compare the received challenge processing time to challenge processing times of other white boxes 305 that have identical (e.g., same manufacturer and same model) or very similar (e.g., same manufacturer and different model) operational specifications (e.g., normal challenge processing time). If the received challenge processing time for the neighboring white box 305 exceeds the normal challenge processing time by a predetermined percentage (e.g., +10%), the white box 305 can send an alert to the WIMS 300 indicating that the neighboring white box 305 may be compromised. For example, white box X can send challenges to white box Y and white box Z which are the same or similar from an operational perspective. If the challenge responses received by white box X from white box Y or white box Z are significantly consistently different, white box X can trigger an alarm to the WIMS to investigate and compare processing times for white box Y or white box Z with average challenge processing time data of other identical white boxes or SDN nodes.

The WIMS 300 can send additional challenges to verify that the neighboring white box 305 has been compromised and take remedial measures upon verification that the neighboring white box 305 has been compromised.

Figure 4:
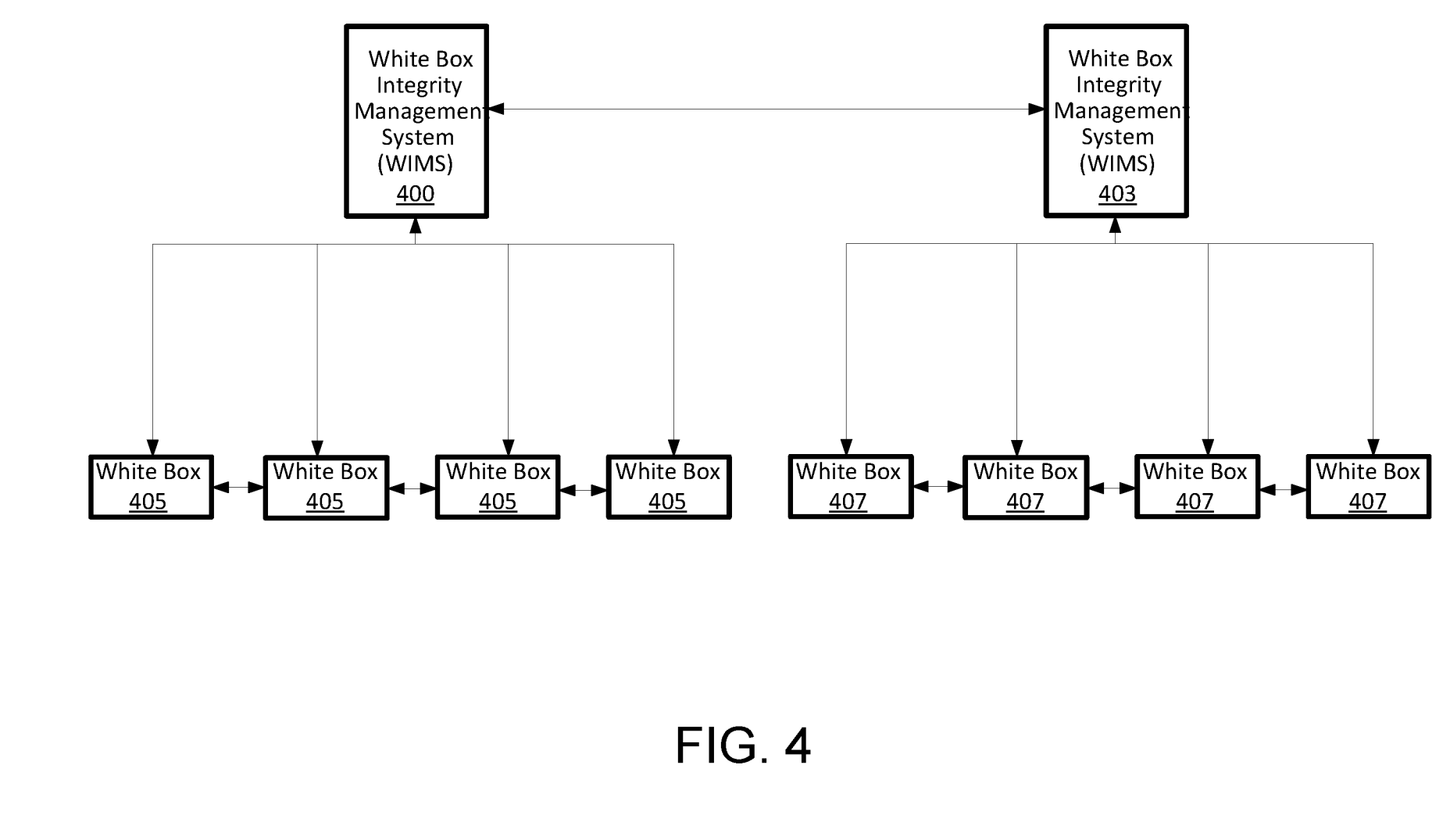
FIG. 4 illustrates an exemplary block diagram of a WIMS for a network according to one or more embodiments.

FIG. 4 illustrates an exemplary utilization of multiple white box integrity management system (WIMS) 400 and 403 used to monitor white boxes 405 and 407 within network 100 according to one or more embodiments. The WIMS 400 and WIMS 403 can operate in a manner similar to WIMS 300. Moreover, white boxes 405 and white boxes 407 can operate in a manner similar to white boxes 305. In addition, white boxes 405 or white boxes 407 can be of different type (e.g., different manufacturers), different models, or provide different functionality within a network.

WIMS 400 can provide infection detection or isolation for white boxes 405, which have identical or very similar operational specifications and WIMS 403 can provide infection detection and isolation for white boxes 407, which have identical or very similar operational specifications but are different in operational specifications from white boxes 405. In addition, WIMS 400 and WIMS 405 are communicatively coupled to gain insight into infections occurring in other portions of the network 100.

A different WIMS can be assigned to provide infection detection and isolation for each disparate set of white boxes (e.g., white boxes having different operational specifications) in network 100. In addition, a single WIMS can be assigned to provide infection detection and isolation for multiple sets of disparate white boxes using, for example, a partitioning of log used by the WIMS.

Figure 5:
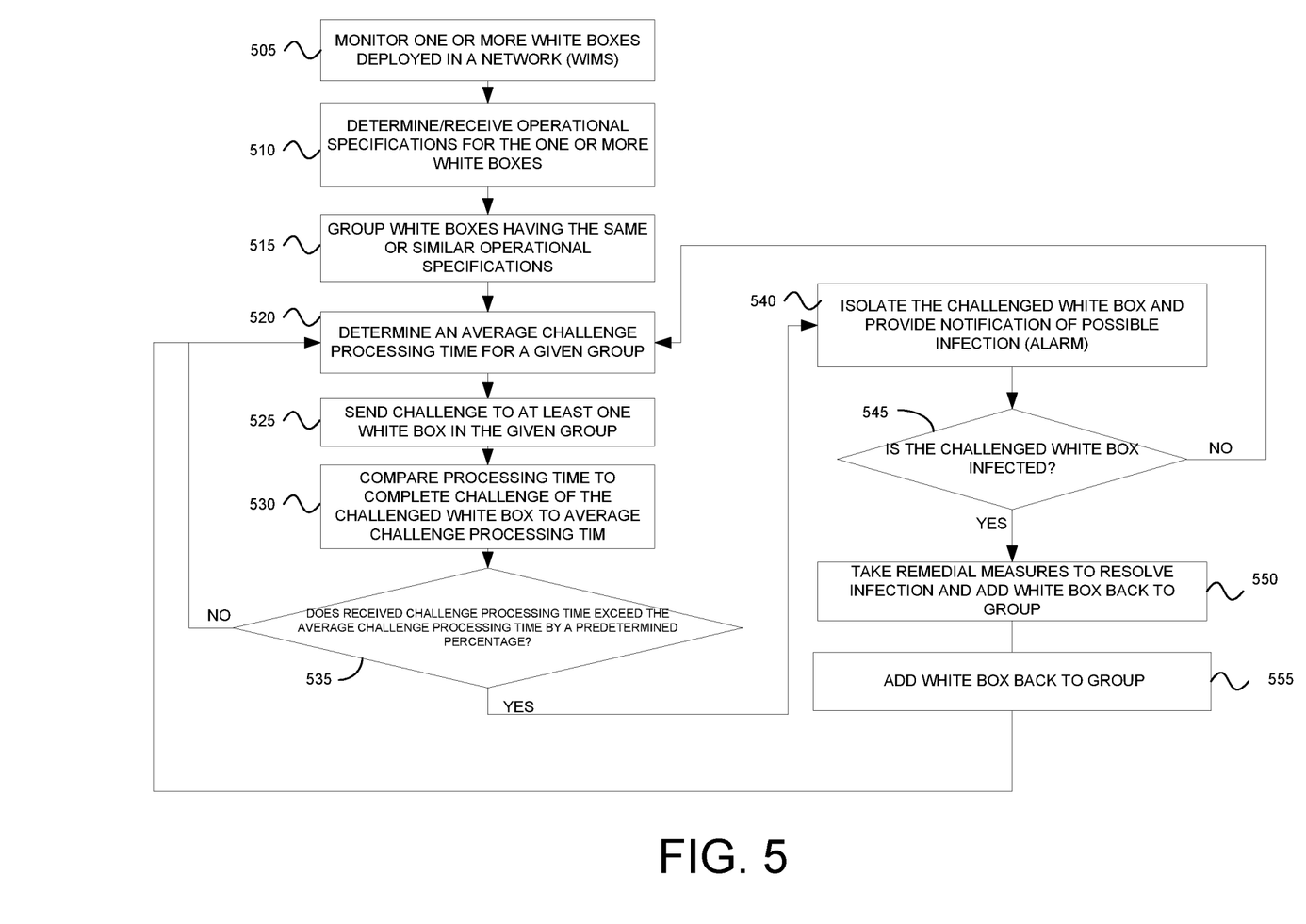
FIG. 5 illustrates an exemplary for white box infection detection and isolation according to one or more embodiments.

FIG. 5 is an exemplary flow diagram illustrating a method for white box infection detection and isolation according to one or more embodiments. At block 505, a white box integrity management system (WIMS), for example, WIMS 300, can monitor one or more white boxes within a network. At block 510, the WIMS can determine or receive operational specifications related to the one or more white boxes. At block 515, the WIMS can group the one or more white boxes according to their respective operational specifications. At block 520, the WIMS can determine an average processing time taken for a particular group of white boxes to respond to challenges sent by the WIMS. At block 525, the WIMS can send a challenge via, for example, a keep alive message, to one or more specified white boxes to determine whether the one or more specified white boxes have been infected. At block 530, the WIMS can compare a challenge response time for the specified one or more white boxes to the respective group average challenge processing time. At block 535, the WIMS can determine whether the challenge response time for the specified one or more white boxes exceeds the respective group average challenge processing time by the predetermined percentage, for example, 10 percent. If the challenge response time for the specified one or more white boxes does not exceed the respective group average challenge processing time by a predetermined percentage, the method returns to block 520.

If the challenge response time for the specified one or more white boxes exceeds the respective group average challenge processing time by the predetermined percentage, the method proceeds to block 540 where the WIMS can isolate the infected one ore more white boxes. For example, the WIMS can block communications to or from the infected one or more white boxes. In addition, the WIMS can provide a notification indicating that the one or more white boxes may be infected and requires further investigation.

At block 545, the WIMS can determine whether the one or more white boxes associated with the infection notification are in fact infected. For example, the WIMS can send additional challenges to the one or more white boxes to verify whether or not one or more white boxes have been compromised. In instances where the infection notification is received by a mobile device, the technical support or network engineers can verify whether the one or more specified white boxes have been infected. If the one or more white boxes associated with the infection notification are not actually infected, the method returns to block 520. If the one or more white boxes associated with the infection notification are in fact infected, the method proceeds to block 550 where the technical support or network engineers can take remedial measures to remove the infection from the one or more white boxes that are infected. In some instances, the WIMS itself can take remedial measures to remove the infection from the one or more white boxes that are infected. Upon, receiving an indication that the infection was removed from the one or more white boxes, at block 555, the WIMS can restore communications to or from the one or more previously isolated white boxes.

Figure 6:
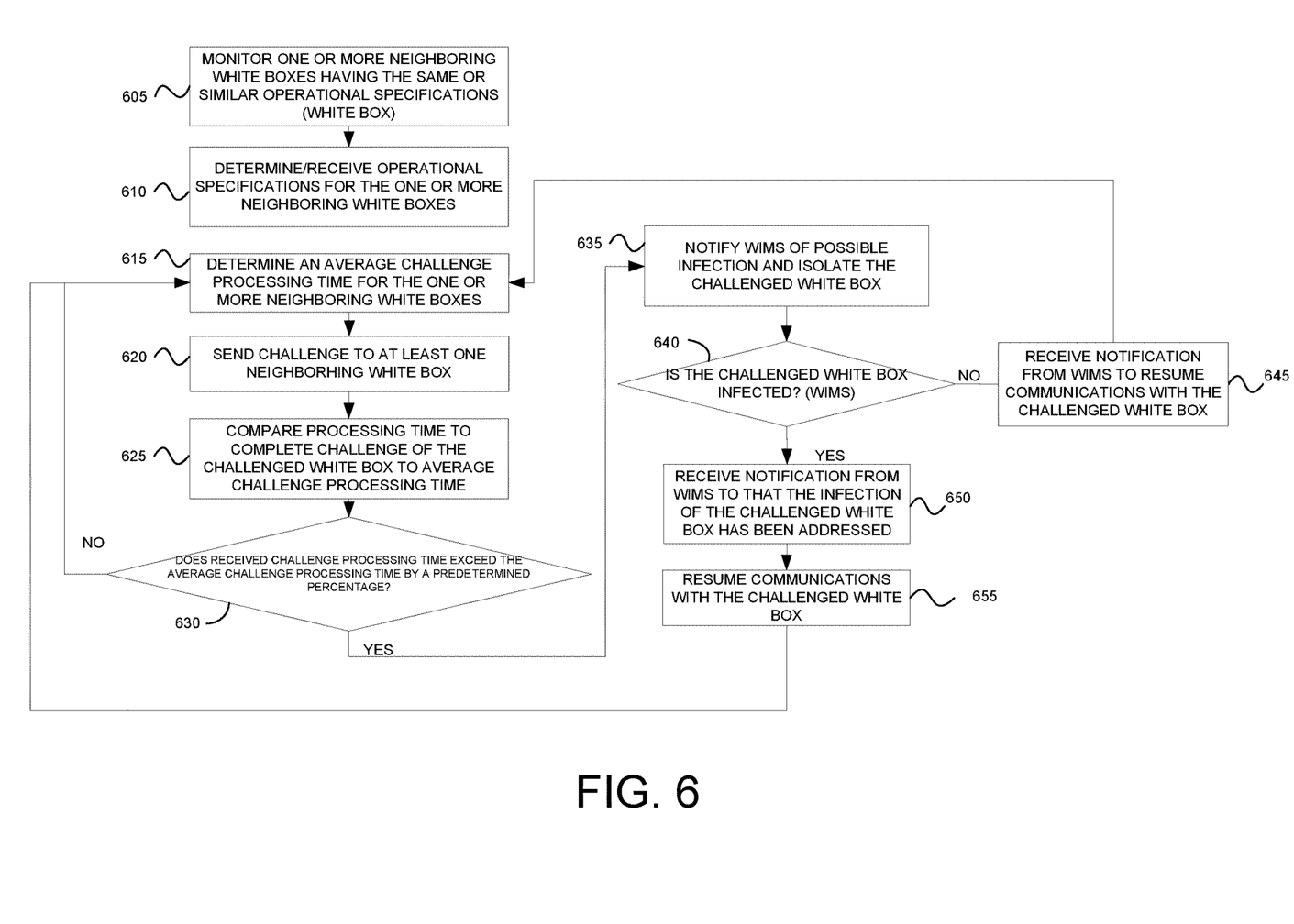
FIG. 6 illustrates an exemplary for white box infection detection and isolation according to one or more embodiments.

FIG. 6 is an exemplary flow diagram illustrating a method for white box infection detection and isolation according to one or more embodiments. At block 605, a white box, for example, white box 305, can monitor one or more neighboring white boxes. At block 610, the white box can determine or receive operational specifications related to the one or more neighboring white boxes. At block 615, the white box can determine an average processing time taken for neighboring white boxes to respond to challenges sent by the white box. At block 620, the white box can send a challenge via, for example, a keep alive message, to one or more neighboring white boxes to determine whether the one or more neighboring white boxes have been infected. At block 625, the white box can compare a challenge response time for the neighboring one or more white boxes to the respective neighboring white box (neighbor) average challenge processing time. At block 630, the white box can determine whether the challenge response time for the neighboring one or more white boxes exceeds the respective neighbor average challenge processing time by the predetermined percentage, for example, 10 percent. If the challenge response time for the neighboring one or more white boxes does not exceed the respective neighbor average challenge processing time by a predetermined percentage, the method returns to block 615.

If the challenge response time for the neighboring one or more white boxes exceeds the respective neighbor average challenge processing time by the predetermined percentage, the method proceeds to block 635 where the white box can notify a white box integrity management system (WIMS) (e.g., WIMS 300) of an occurrence of a possible infection of one or more neighboring white boxes, as well as ceasing communications with the possibly infected one or more neighboring white boxes. At block 640, the WIMS can determine whether the possibly infected one or more neighboring white boxes are in fact infected. For example, technical support or network engineers can receive an infection notification and verify whether the possibly infected one or more neighboring white boxes have been infected. If the possibly infected one or more neighboring white boxes are not actually infected, the method proceeds to block 645 where the WIMS can notify the white box that sent the possible infection notification that there is no infection and the white box can resume communications with the one or more neighboring white boxes. After block 645, the method returns to block 615.

If the possibly infected one or more neighboring white boxes are in fact infected, the method proceeds to block 650 the WIMS can inform the white box that sent the possible infection notification that technical support/network engineers are taking remedial measures to remove the infection from the one or more white boxes that are infected. In some instances, the WIMS itself can take remedial measures to remove the infection from the one or more white boxes that are infected. Upon, the infection being removed from the one or more white boxes, at block 655, the white box that sent the possible infection notification can be notified, by the WIMS, to restore communications to or from the one or more neighboring white boxes previously isolated.

Figure 7:
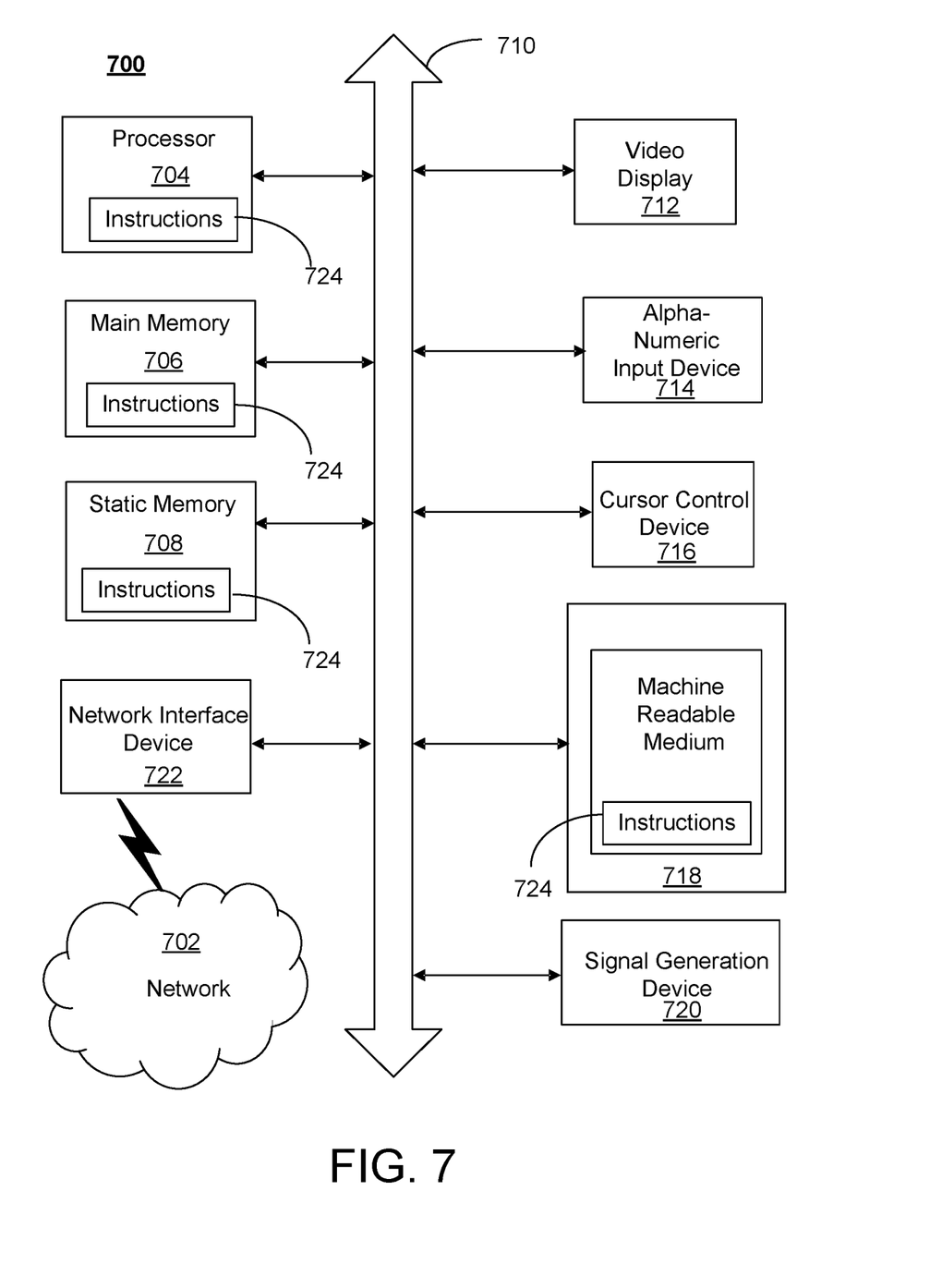
FIG. 7 illustrates an exemplary communication system that provides wireless telecommunication services over wireless communication networks.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as a white box described in of FIG. 3 and FIG. 4. In some embodiments, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the embodiments described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium 724 on which is stored one or more sets of instructions (e.g., software 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

As described herein, a white box integrity management system (WIMS) or white box infection detection and isolation system and method may be implemented to detect and isolate infected white boxes within a communications network to prevent an occurrence of a wide scale infection of the communications network due to hackers infiltrating a single white box and taking advantage of the fact that other the white boxes in the communications network are of identical or similar design. The WIMS discussed herein knows the topology (connectivity) of the communications network. The WIMS also can store a copy of the original core (e.g., firmware and operating system) for each make and model of white boxes in the communications network that can be obtained from the manufacturer of each white box deployed in the communications network. The WIMS can store a copy of each VM code and configurations of each VM deployed in the network, which can be obtained from an administrator or VM developer.

The WIMS can be located anywhere in a network (e.g., in a centralized or distributed management location) that allows the WIMS to monitor the elements (e.g., white boxes) in the network. The WIMS can also be co-located with white boxes or reside at a remote location.

In addition, the WIMS can work in conjunction with infection detection and isolation conducted by one or white boxes. For example, the WIMS can selectively designate a white box for white box infection detection and isolation while receiving white box infection detection and isolation information for one or more neighboring white boxes from the designated white box or another white box in the network.

While examples of a white box integrity management system (WIMS) or white box infection detection and isolation have been described in connection with a software defined network (SDN), the underlying concepts may be applied to any cloud based environment. The various techniques described herein may be implemented in connection with hardware or software or, where appropriate, with a combination of both. Thus, the methods and devices may take the form of program code (e.g., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—software defined network white box infection detection or isolation—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
identifying, by a processing system including a processor, a plurality of white boxes according to operational specifications, wherein the plurality of white boxes is configured to implement virtualized functions;
monitoring, by the processing system, the plurality of white boxes deployed within a communications network;
sending, by the processing system, a challenge to a first white box of the plurality of white boxes;
determining, by the processing system, a processing time to answer the challenge by the first white box;
in response to receiving an answer to the challenge, determining, by the processing system, whether the processing time exceeds an average challenge processing time for the challenge by a predetermined percentage, wherein the average challenge processing time is determined according to a plurality of challenge processing times observed for the plurality of white boxes; and
in response to the processing time exceeding the average challenge processing time by the predetermined percentage, isolating, by the processing system, the first white box from the communications network.

2. The method of claim 1 further comprising:
determining, by the processing system, whether the first white box is infected based on the processing time exceeding the average challenge processing time by the predetermined percentage;
in response to the determination that the first white box is infected, taking, by the processing system, remedial measures to remove an infection from the first white box to obtain a non-infected white box; and
in response to taking remedial measures, restoring, by the processing system, communications with the non-infected white box by components of the communications network.

3. The method of claim 1, wherein the challenge is included in a keep alive message of a plurality of keep alive messages periodically sent to the plurality of white boxes.

4. The method of claim 1, wherein the challenge is sent by a white box integrity management systems (WIMS).

5. The method of claim 1, wherein the challenge is sent by a neighboring white box of the first white box.

6. The method of claim 1, wherein the challenge is at least one of a random code and a random puzzle.

7. The method of claim 1, wherein the average challenge processing time is based on a challenge processing time for each white box in a group of white boxes of the plurality of white boxes that are essentially identical.

8. An apparatus comprising:
a processing system including a processor; and
a memory that stores executable instructions that when executed by the processing system, facilitate performance of operations, the operations comprising:
identifying a plurality of white boxes according to operational specifications, wherein the plurality of white boxes is configured to implement virtualized functions;
monitoring flail the plurality of white boxes deployed within a communications network;
sending a challenge to a first white box of the plurality of white boxes;
determining a processing time to answer the challenge by the first white box;
in response to receiving an answer to the challenge, determining whether the processing time exceeds an average challenge processing time for the challenge by a predetermined percentage, wherein the average challenge processing time is determined according to a plurality of challenge processing times observed for the plurality of white boxes; and
in response to the processing time exceeding the average challenge processing time by the predetermined percentage, isolating the first white box from the communications network.

9. The apparatus of claim 8, wherein the operations further comprise:
determining whether the first white box is infected based on the processing time exceeding the average challenge processing time by the predetermined percentage;
in response to the determination that the first white box is infected, taking remedial measures to remove an infection from the first white box; and
in response to taking remedial measures, restoring communications with one or more white boxes by components of the communications network.

10. The apparatus of claim 8, wherein the challenge is included in a keep alive message.

11. The apparatus of claim 8, wherein the challenge is sent by a white box integrity management systems (WIMS).

12. The apparatus of claim 8, wherein the challenge is sent by a neighboring white box of the first white box.

13. The apparatus of claim 8, wherein the challenge is at least one of a random code and a random puzzle.

14. The apparatus of claim 8, wherein the average challenge processing time is based on a processing time for each white box in a group of white boxes that are essentially identical.

15. A non-transitory, machine-readable storage medium comprising executable instructions that when executed by a processing system including a processor, facilitate performance of operations, the operations comprising:
identifying a plurality of white boxes according to operational specifications, wherein the plurality of white boxes is configured to implement virtualized functions;
monitoring the plurality of white boxes deployed within a communications network;
sending a challenge to a first white box of the plurality of white boxes;

determining a processing time to answer the challenge by the first white box;

in response to receiving an answer to the challenge, determining whether the processing time exceeds an average challenge processing time for the challenge by a predetermined percentage, wherein the average challenge processing time is determined according to a plurality of challenge processing times observed for the plurality of white boxes; and in response to the processing time exceeding the average challenge processing time by the predetermined percentage, isolating the first white box from the communications network.

16. The non-transitory, machine-readable storage medium of claim 15 further comprising:

determining whether the first white box is infected;

in response to the determination that the first white box is infected, taking remedial measures to remove an infection from the first white box; and in response to taking remedial measures, restoring communications with one or more white boxes of the plurality of white boxes by components of the communications network.

17. The non-transitory, machine-readable storage medium of claim 15, wherein the challenge is included in a keep alive message.

18. The non-transitory, machine-readable storage medium of claim 15, wherein the challenge is sent by a white box integrity management systems (WIMS).

19. The non-transitory, machine-readable storage medium claim 15, wherein the challenge is at least one of a random code and a random puzzle.

20. The non-transitory, machine-readable storage medium claim of 15, wherein the average challenge processing time is based on a processing time for each white box in a group of white boxes that are essentially identical.

* * * * *

UNITED STATES PATENT AND TRADEMARK OFFICE
CERTIFICATE OF CORRECTION

PATENT NO. : 11,316,884 B2  
APPLICATION NO. : 16/558592  
DATED : April 26, 2022  
INVENTOR(S) : Joseph Soryal Page 1 of 1

It is certified that error appears in the above-identified patent and that said Letters Patent is hereby corrected as shown below:

In the Claims

In Claim 8, Column 14, Line 16, replace "monitoring flail the plurality of white boxes deployed" with -- monitoring the plurality of white boxes deployed --

In Claim 19, Column 16, Line 12, replace "claim 15, wherein the challenge is at least one of a random" with -- of claim 15, wherein the challenge is at least one of a random --

In Claim 20, Column 16, Line 15, replace "claim of 15, wherein the average challenge processing time" with -- of claim 15, wherein the average challenge processing time --

Signed and Sealed this  
Seventh Day of June, 2022

Katherine Kelly Vidal  
*Director of the United States Patent and Trademark Office*